US012651739B2

(12) United States Patent

Mitchell

(10) Patent No.: US 12,651,739 B2

(45) Date of Patent: *Jun. 9, 2026**

(54) METHOD OF MANUFACTURING A DRY ELECTRODE

(71) Applicant: Tesla, Inc., Austin, TX (US)

(72) Inventor: Porter Mitchell, Chandler, AZ (US)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/318,121

(22) Filed: Sep. 3, 2025

(65) Prior Publication Data

US 2026/0005219 A1    Jan. 1, 2026

Related U.S. Application Data

(63) Continuation of application No. 17/422,966, filed as application No. PCT/US2020/013531 on Jan. 14, 2020.

(Continued)

(51) Int. Cl.
*H01M 4/04* (2006.01)
*B05C 11/02* (2006.01)
(Continued)

(52) U.S. Cl.
CPC ........... *H01M 4/0435* (2013.01); *B05C 11/02* (2013.01); *B22F 7/08* (2013.01); *B29C 43/58* (2013.01);
(Continued)

(58) Field of Classification Search
CPC .......... B05C 11/02; B05C 11/025; B22F 7/08; B32B 2457/00; B32B 37/206; H01G 11/24; H01G 11/28; H01G 11/82; H01G 11/86
See application file for complete search history.

(56) References Cited

U.S. PATENT DOCUMENTS 3,748,406 A  *  7/1973  Rauhut ................... G11B 5/86
4,064,288 A  *  12/1977  Shah ....................... H01M 6/48
427/256

(Continued)

FOREIGN PATENT DOCUMENTS

CN         103346290         10/2013
DE     102007000753  A1     4/2009

(Continued)

OTHER PUBLICATIONS

Dick, 2009, Rubber Technology: Compounding and Testing for Performance 2nd Edition (TOC).

(Continued)

*Primary Examiner* — Minh N Trinh

(74) *Attorney, Agent, or Firm* — Knobbe, Martens, Olson & Bear, LLP

(57) ABSTRACT

A method for manufacturing a dry electrode via a multi-roll calender system including providing the multi-roll calender system including a first, second, and third calendering rolls, each roll downstream from the next, where a first nip is formed between the first and second calendering rolls, and a second nip is formed between the second and third calendering rolls, rotating the first calendering roll at a first rotational velocity, rotating the second calendering roll at a second rotational velocity greater than the first rotational velocity, rotating the third calendering roll at a third rotational velocity greater than the second rotational velocity, delivering a first dry electrode material to the first nip to form a dry electrode film, delivering the dry electrode film to the second nip to form a tuned dry electrode film, and laminating the tuned dry electrode film to a current collector to form the dry electrode.

25 Claims, 13 Drawing Sheets

Related U.S. Application Data

(60) Provisional application No. 62/793,333, filed on Jan. 16, 2019.

(51) Int. Cl.

| | |
|---|---|
| *B22F 7/08* | (2006.01) |
| *B29C 43/58* | (2006.01) |
| *B29C 65/00* | (2006.01) |
| *H01G 11/28* | (2013.01) |
| *H01G 11/86* | (2013.01) |

(52) U.S. Cl.
CPC ........ *B29C 66/83411* (2013.01); *H01G 11/86* (2013.01); *H01M 4/0404* (2013.01); *B05C 11/025* (2013.01); *H01G 11/28* (2013.01)

(56) References Cited

U.S. PATENT DOCUMENTS

| | | | |
|---|---|---|---|
| 5,658,639 | A | 8/1997 | Curro |
| 6,368,365 | B1 | 4/2002 | Chi et al. |
| 7,295,423 | B1 | 11/2007 | Mitchell et al. |
| 7,352,558 | B2 | 4/2008 | Zhong et al. |
| 9,156,071 | B2 | 10/2015 | Hackfort et al. |
| 11,043,658 | B2 | 6/2021 | Tanaka |
| 11,050,121 | B2 | 6/2021 | Eskra |
| 11,251,175 | B2 | 2/2022 | Ayres et al. |
| 11,430,613 | B2 | 8/2022 | Mitchell |
| 12,136,727 | B2 | 11/2024 | Bogenstahl et al. |
| 12,237,494 | B2 | 2/2025 | Bogenstahl et al. |
| 12,334,534 | B2 | 6/2025 | Bogenstahl |
| 2006/0133012 | A1 | 6/2006 | Zhong et al. |
| 2006/0147712 | A1 | 7/2006 | Mitchell et al. |
| 2006/0148191 | A1 | 7/2006 | Mitchell |
| 2006/0248710 | A1 | 11/2006 | Fukumoto |
| 2009/0325045 | A1 | 12/2009 | Miyahisa et al. |
| 2014/0070449 | A1 | 3/2014 | Van De Hee et al. |
| 2014/0374248 | A1 | 12/2014 | Datz et al. |
| 2015/0303481 | A1 | 10/2015 | Duong et al. |
| 2016/0082467 | A1 | 3/2016 | Mikami |
| 2016/0118642 | A1 | 4/2016 | Enokihara |
| 2016/0181651 | A1 | 6/2016 | Tanihara et al. |
| 2017/0040591 | A1 | 2/2017 | Nakano |
| 2017/0098826 | A1 | 4/2017 | Mitchell et al. |
| 2020/0212421 | A1 | 7/2020 | Du et al. |
| 2020/0227722 | A1* | 7/2020 | Bogenstahl ......... H01M 4/0435 |
| 2022/0072612 | A1* | 3/2022 | Mitchell ................ H01G 11/82 |
| 2025/0029976 | A1 | 1/2025 | Bogenstahl et al. |
| 2025/0253307 | A1 | 8/2025 | Mitchell |
| 2026/0066263 | A1 | 3/2026 | Mitchell |

FOREIGN PATENT DOCUMENTS

| | | | |
|---|---|---|---|
| DE | 102024102666 | 7/2025 | |
| JP | 04-62750 | 2/1992 | |
| JP | 2012-216465 | 11/2012 | |
| JP | 2015-164717 | 9/2015 | |
| JP | 2017-027849 | 2/2017 | |
| WO | WO-9411556 A1 * | 5/1994 | ........... D04H 1/5412 |
| WO | WO 96/40480 | 12/1996 | |
| WO | WO 14/156464 | 10/2014 | |
| WO | WO 14/175756 | 10/2014 | |
| WO | WO 01/8210723 | 11/2018 | |
| WO | WO-2018210723 A1 * | 11/2018 | ......... H01M 4/0435 |

OTHER PUBLICATIONS

Johnson et al., 2004, Transfer of material between rolling and sliding surfaces, International Journal of Mechanical Sciences, 46:343-357.

Kopsch, 1978, Kalandertechnik, Carl Hanser Verlag, Munich (TOC).

Saueressig Engineering; Melt-Roll Coating Calender, with 2 or 3 rollers for efficient processing of thermoplastic materials; Product Brochure; 2000, 17 pp.

Saueressig Engineering; Melt-Roll Coating Calender, with 2 or 3 rollers for processing thermoplastic materials; Product Brochure; 2000, 19 pp.

Wood et al., Aug. 29, 2017, Technical and Economic Analysis of Solvent-based Lithium-ion Electrode Drying with Water and NMP, Drying Technology, 36(2):1-11.

International Search Report and Written Opinion dated Jun. 30, 2020 in application No. PCT/US2020/013531.

* cited by examiner

440

445

400

METHOD OF MANUFACTURING A DRY ELECTRODE

CROSS-REFERENCE TO RELATED APPLICATIONS

This present application is a continuation of U.S. application Ser. No. 17/422,966, filed Jul. 14, 2021, which is a National Stage Application, filed under 35 U.S.C. 371, of International Patent Application No. PCT/US2020/013531, filed Jan. 14, 2020, which claims priority benefit under 35 U.S.C. § 119 (e) to U.S. Provisional Application No. 62/793,333, filed Jan. 16, 2019, entitled "SYSTEM AND METHODS FOR MANUFACTURING A DRY ELECTRODE" each of which is hereby incorporated by reference in its entirety.

BACKGROUND

Field

The described technology generally relates to energy storage devices, and specifically to simplified systems and methods for manufacturing dry electrodes for energy storage devices.

Description of the Related Technology

Electrodes can be implemented within electrical energy storage cells, which are widely used to provide power to electronic, electromechanical, electrochemical, and other useful devices. Such cells include batteries such as primary chemical cells and secondary (rechargeable) cells, fuel cells, and various species of capacitors, including ultracapacitors. Electrodes can also be implemented within water purification systems. Decreasing the operating costs and improving the efficiencies of electrode manufacturing would be desirable.

SUMMARY

For purposes of summarizing the described technology, certain objects and advantages of the described technology are described herein. Not all such objects or advantages may be achieved in any particular embodiment of the described technology. Thus, for example, those skilled in the art will recognize that the described technology may be embodied or carried out in a manner that achieves or optimizes one advantage or group of advantages as taught herein without necessarily achieving other objects or advantages as may be taught or suggested herein.

One inventive aspect is a system for manufacturing a dry electrode for an energy storage device. The system includes a first dry electrode material delivery system configured to deliver a dry electrode material, a first calendering roll, a second calendering roll, and a controller. The second calendering roll is configured to form a first nip between the first calendering roll and the second calendering roll. The first nip is configured to receive the dry electrode material from the first dry electrode material delivery system, and form a dry electrode film from the dry electrode material. The controller is configured to control a rotational velocity of the second calendering roll to be greater than a rotational velocity of the first calendering roll.

In another aspect, the dry electrode film is not self-supporting.

In another aspect, the system further includes a third calendering roll configured to form a second nip between the third calendering roll and a calendering roll positioned adjacent to and upstream of the third calendering roll, the second nip configured to receive the dry electrode film from the first nip. In another aspect, the upstream adjacent calendering roll is the second calendering roll. In another aspect, the controller is further configured to control a rotational velocity of the third calendering roll to be greater than a rotational velocity of the second calendering roll. In another aspect, the system further includes a current collector source configured to supply a current collector to the second nip, wherein the second nip is configured to receive the current collector and laminate the current collector to the dry electrode film to form a dry electrode. In another aspect, the system further includes a second dry electrode material delivery system configured to deliver a second dry electrode material. In another aspect, the first nip is configured to receive the second dry electrode material from the second dry electrode material delivery system and form a dry electrode film from the first and the second dry electrode material. In another aspect, the first and second dry electrode material are the same material. In another aspect, the system further includes a fourth calendering roll configured to form a third nip between the fourth calendering roll and a calendering roll positioned adjacent to and downstream of the fourth calendering roll, wherein the third nip is configured to receive the second dry electrode material from the second dry electrode material delivery system and form a second dry electrode film. In another aspect, the downstream adjacent calendering roll is the third calendering roll. In another aspect, the controller is configured to control a rotational velocity of the third calendering roll to be greater than a rotational velocity of the fourth calendering roll. In another aspect, the system further includes a current collector source configured to supply a current collector to the second nip, wherein the second nip is configured to receive the current collector and laminate the current collector to the first dry electrode film and the second dry electrode film to form a dual sided dry electrode.

One inventive aspect is a laminator for manufacturing an intermittent electrode. The laminator includes a first calendering roll, a second calendering roll, one or more lamination actuators, and one or more gap control actuators. The one or more lamination actuators are configured to provide a first force between the first calendering roll and the second calendering roll during lamination of an intermittent electrode. The one or more gap control actuators are configured to provide a second force to the first and second calendering rolls, wherein the second force opposes and counteracts the first force.

In another aspect, the laminator further includes a sensor and a controller. The sensor is configured to detect non-coated areas within an electrode film. The controller is configured to engage the one or more gap control actuators when the non-coated areas within the electrode film pass between the first and the second calendering rolls.

Another inventive aspect includes a method of manufacturing a dry electrode for an energy storage device. The method includes rotating a first calendering roll at a first rotational velocity, rotating a second calendering roll at a second rotational velocity, and providing a dry electrode material to a nip between the first calendering roll and the second calendering roll to form a dry electrode film, wherein the second rotational velocity is greater than the first rotational velocity.

In some embodiments, the dry electrode material is in free flowing particle form. In some embodiments, the dry electrode film adheres to the second calendering roll when formed.

Another inventive aspect includes a method of manufacturing an intermittent electrode. The method includes providing an intermittent electrode film and a current collector, feeding the intermittent electrode film and the current collector between a first calendering roll and a second calendering roll, providing a first force between the first calendering roll and the second calendering roll to the current collector, and providing a second force to the first and second calendering rolls, wherein the second force opposes and counteracts the first force.

In some embodiments, providing the first force presses the intermittent electrode film to the current collector, and providing the second force provides a constant gap between the first and second rolls during lamination of non-coated portions of the intermittent electrode film.

DETAILED DESCRIPTION

Figure 1A:
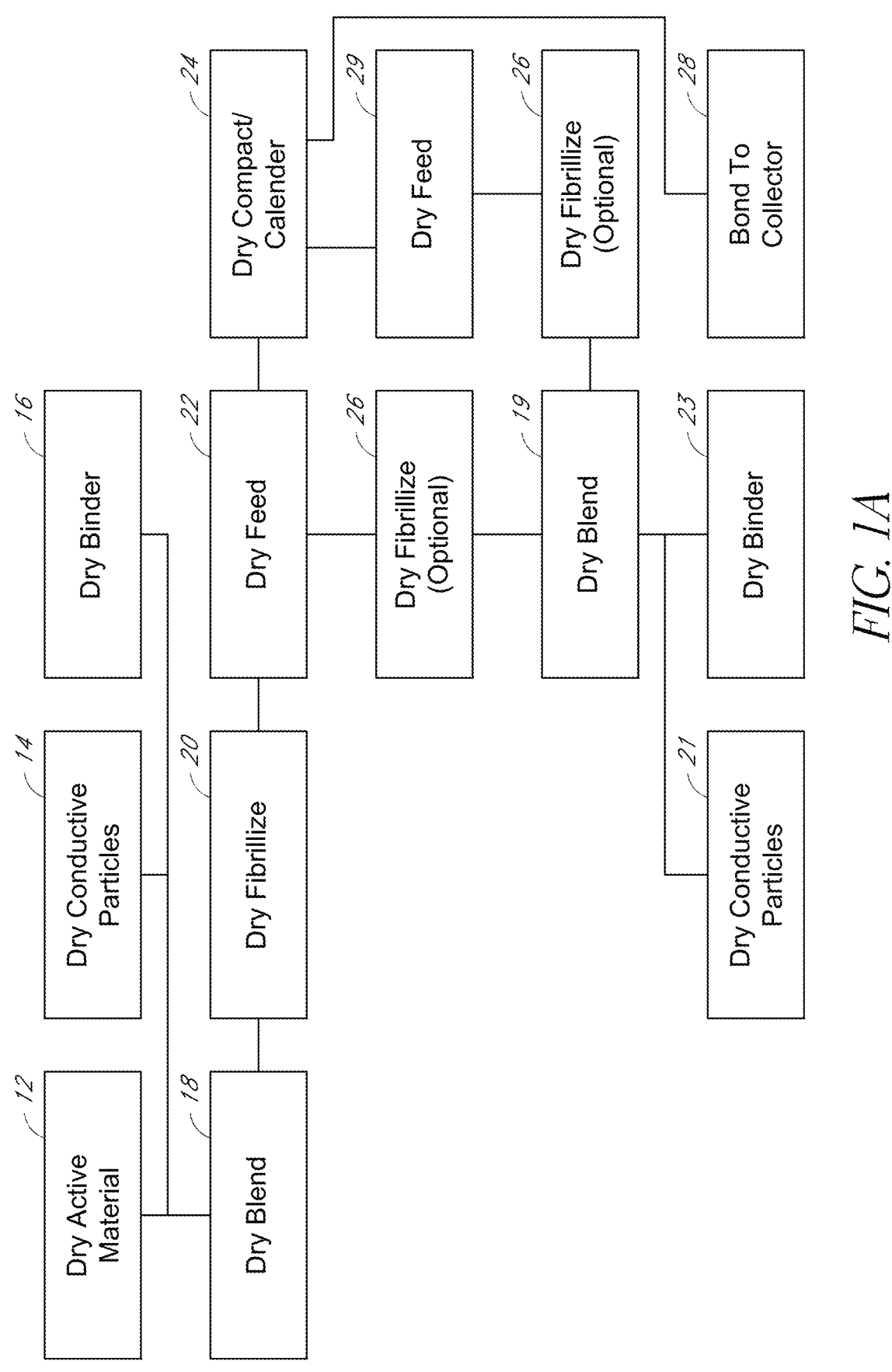
FIG. 1A is a block diagram illustrating a process for manufacturing a dry electrode for an energy storage device.

Energy storage devices such as lithium ion batteries have been relied on as a power source in numerous commercial and industrial uses, for example, in consumer devices, productivity devices, and in battery powered vehicles. However, demands placed on energy storage devices are continuously- and rapidly-growing. For example, the automotive industry is developing vehicles that rely on compact and efficient energy storage, such as plug-in hybrid vehicles and pure electric vehicles. Lithium ion batteries are well suited to meet future demands.

Key components of the storage potential of an energy storage device are electrodes. The electrochemical capabilities of electrodes, for example, the capacity and efficiency of battery electrodes, are governed by various factors. For example, distribution of active material, binder and additive(s); the physical properties of materials therein, such as particle size and surface area of active material; the surface properties of the active materials; and the physical characteristics of the electrode film, such as density, porosity, cohesiveness, and adhesiveness to a conductive element. Dry processing systems and methods traditionally used a high shear and/or high pressure processing step to break up and commingle electrode film materials. Such systems and methods may contribute to structural advantages over electrode films produced using a wet process. However, the high processing pressures and large amount of equipment (and thus, the large footprint) used to form dry, self-supporting electrode films and dry electrodes leave room for improvement.

The systems and methods provided herein can be implemented to manufacture dry electrode films and electrodes for various energy storage devices. As provided herein, an energy storage device can be a capacitor, a lithium ion capacitor (LIC), an ultracapacitor, a battery such as a lithium ion battery, or a hybrid energy storage device combining aspects of two or more of the foregoing.

The various embodiments of systems and methods herein provide improved manufacturing of a dry electrode film and dry electrode for use in energy storage devices. The disclosed embodiments can provide a simplified and cost-effective procedure for manufacturing energy storage devices.

The materials and methods provided herein can be implemented in various electrodes for energy storage devices and/or water purification. As provided herein, an energy storage device can be a capacitor, a lithium ion capacitor (LIC), an ultracapacitor, a battery such as a lithium ion battery, or a hybrid energy storage device combining aspects of two or more of the foregoing. In some embodiments, the method and apparatus for forming dry electrode film, as described herein, allow continuous, multi-stripes, or intermittent form factor electrodes.

Embodiments of method and apparatus for forming dry electrode film herein can provide one or more of the following advantages. Some embodiments allow for the fabrication of both thin and thick films in wide format, high precision low tolerance films, with adjustable densities. Some embodiments allow for films that are ultracapacitor (UCAP) or battery or Lcap or fuel cell electrodes, or water purification electrodes or combination of electrodes. Some embodiments allow for the reduction in factory floor area, material handing requirements and number of operator personnel, by combining calendering, laminating, peeling and slitting into one machine. Some embodiments allow for enabling multilayer functional webs by using one or more dry electrode material delivery systems, such as powder delivery hoppers. Some embodiments allow increases in the available diversity of formulations that can be used to make films and electrodes (such as self-supporting dry electrode films and dry electrodes), e.g., lithium metal powder, silicon/silicon oxides, cathodic or anodic active materials infused within porous conductive carbons, e.g. molten sulfur and activated carbon, solid state electrolyte, or other air/moisture sensitive materials.

Additional features or advantages provided by embodiments herein include a continuous process from raw material (e.g., powder) to a laminated electrode without rewind/unwind of one or more layers used to form the electrode. A dry electrode film formed by the system/method is not (at least initially, or throughout the entire process) required to be self-supporting, as it can be positioned on and supported by a calendaring roll during at least some, if not all, of the process steps. For example, the dry electrode film can be supported by at least one calendering roll through all process steps within a multi roll calendering system, through and including the lamination step, when the dry electrode film is laminated with a current collector to form a dry electrode.

Embodiments of the multi roll calender(s) herein can have additional attributes not found in conventional calendering. The number of calender nips can be from two (three rolls) to six (seven rolls) or more, but at lower process pressures and forces. Each roll can be individually driven with a motor and gear drive and can be individually addressable. Line loads in a multi calender system can be much lower than in conventional calender yet the system can be configurable to achieve thinner dry films. Individual roll speeds can be controlled and individual gaps between each calender nip can be controlled. Individual roll temperatures can also be controlled. For example, in some embodiments, the final roll of the stacked multi roll system can be temperature controlled to assist with lamination of the dry electrode film(s) onto the current collector. Web handling can be simpler and easier, reducing or eliminating idler rolls within the web path. In some embodiments, adjacent roll sets (either within a paired calender nip, or between two adjacent nips) can be rotated at different speeds. For example, each subsequent, downstream roll set (e.g., calender nip) can be configured to rotate faster than the previous. Additionally, each individual roll in a two-roll nip set can be configured to rotate differently than the other roll in the same two-roll nip set. These different speeds can provide sheer within a film, and/or can create forces that improve the adherence of the film to any given roll.

In some embodiments, gauges, such as Gamma gauges, can be used for film thickness or specific mass measurements for thickness control/measurement. Rollers can be fixed in a unique position with playless bearings (orientated but captured bearings may be required). Conical bearings or other bearing designs can be used for playless fixation of rolls, provided the low tolerances of desired film thickness are achieved. Embodiments do not require the same diameter rolls for each nip or for rolls within the nip. The face finish on the rolls could be a coating, (e.g., chrome or hard face ceramic) or even patterned as in an embossing roll.

In some embodiments, two, multiroll calenders can be aligned end to end, allowing a dry electrode film to be laminated directly to a metal foil (e.g., current collector) without first having to remove the film and taken to a separate machine. Thus, the same machine can provide direct lamination of either single sided or double sided electrode layers onto a current collector to form a single or double sided electrode.

In some embodiments, the laminated electrode can either be continuous web or intermittent electrode designs. Peeling of non-laminated films from laminated webs can be used for both continuous webs and intermittent electrode designs. In some embodiments, the current collectors that are used in the system can be pre-coated with adhesive, or the adhesive can be added to one side of the film through a separate powder hopper on the multiroll calender system, thus allowing direct lamination to the foil without first precoating the material. A slitter can be added after the lamination step to slit the laminated web to the final electrode width and rewind the individual electrode rolls. In some embodiments, the machine can be designed to be self-webbing. For example, using a continuous belt under the rolls, which can rise up during the webbing to ensure the web moves in the proper direction and to the next roll nip.

FIG. 1A is a block diagram illustrating a process for manufacturing a dry electrode for an energy storage device. FIG. 1A is a block diagram illustrating a process for making a dry electrode for an energy storage device. As used herein, the term "dry" implies non-use of liquid-phase solvents and additives in mixing and coating process of electrode during process steps described herein, other than during a final impregnating electrolyte step. The process shown in FIG. 1A begins by dry blending 18 dry active material particles 12, dry conductive particles 18 and dry binder particles 16 to form a dry mixture. Furthermore, dry conductive particles 21 and dry binder particles 23 are also dry blended 19 to form a dry mixture which can be provided to the dry fibrillizing step 26 or 29. The dry mixture is fibrillized in a dry fibrillizing step 20 using, for example, a jet-mill (not shown). During the dry fibrillizing step 20, high shear forces are applied to the dry mixture in order to physically stretch it and form a network of thin web-like fibers. In a dry feed step 22, the respective separate mixtures of dry particles formed in steps 19 and 20 are provided to respective containers (not shown) to form a dry film. The dry film is subsequently dry compacted and calendared by a roll-mill or calendar 24 to provide an embedded/intermixed dry film or a self-supporting electrode film (or electrochemically active free-standing film). The embedded/intermixed dry film is attached to a current collector (e.g., metal foil) 28. A more detailed process of making an embedded/intermixed dry film including types of materials forming the dry films and materials forming the current collector is disclosed in U.S. Pat. No. 7,352,558, which is incorporated by reference herein in its entirety.

A self-supporting dry electrode film manufactured above may provide improved characteristics relative to a typical electrode film that is manufactured using a wet process. For example, a dry electrode film as provided herein may provide one or more of improved film strength, improved cohesiveness, improved adhesiveness, improved electrical performance, or reduced incidence of defects. The defects may include holes, cracks, surface pits in the electrode film. The adhesiveness may be adhesiveness to a current collector. The electrical performance may be specific capacity. The film strength may be tensile strength.

Figure 1B:
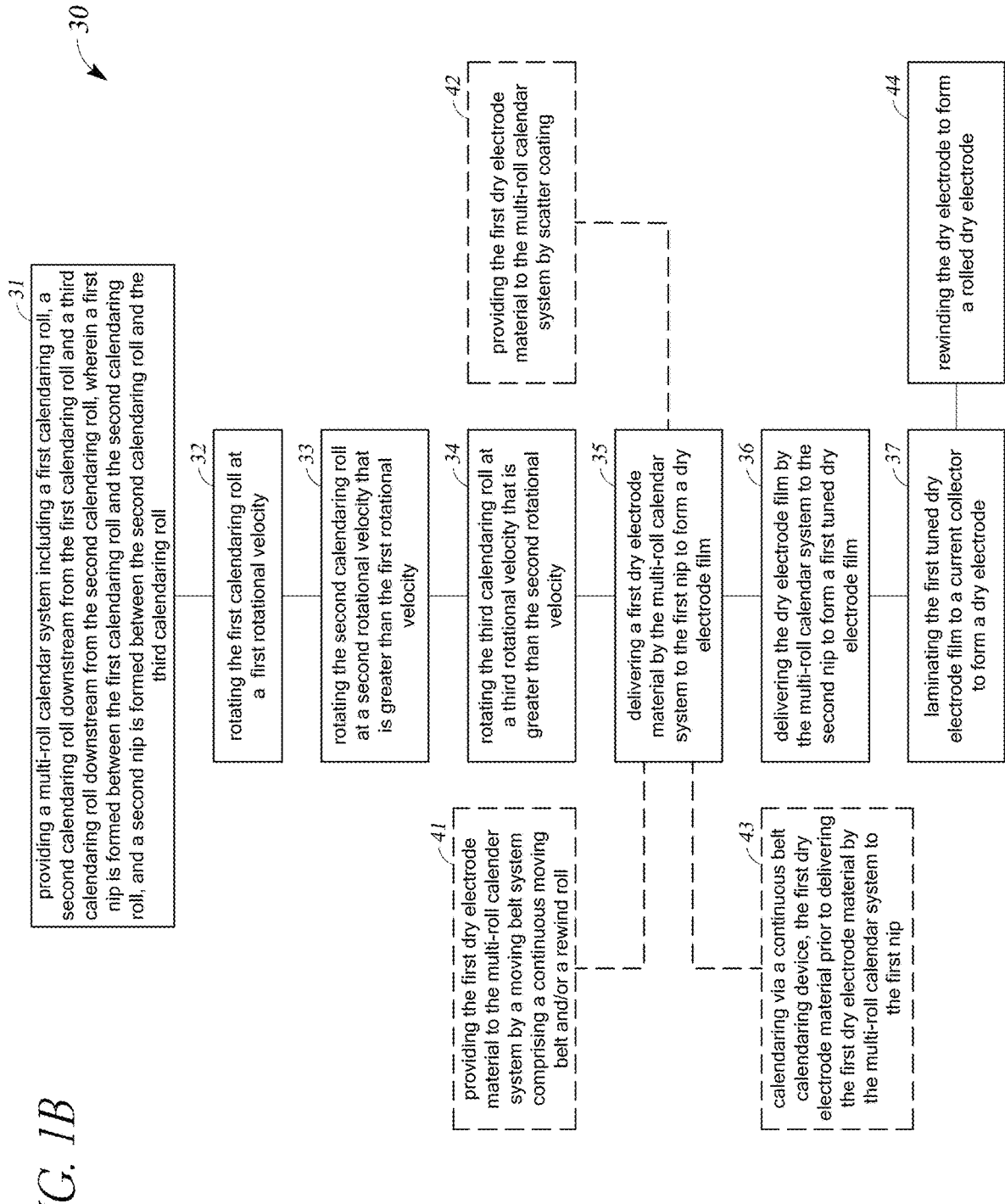
FIG. 1B is a block diagram illustrating a method of manufacturing a dry electrode via a multi-roll calender system.

FIG. 1B is a block diagram illustrating a method 30 of manufacturing a dry electrode via a multi-roll calender system. At step 31, the method 30 includes providing the multi-roll calender system including a first calendering roll, a second calendering roll downstream from the first calendering roll and a third calendering roll downstream from the second calendering roll, wherein a first nip is formed between the first calendering roll and the second calendering roll, and a second nip is formed between the second calendering roll and the third calendering roll. At step 32, the method 30 includes rotating the first calendering roll at a first rotational velocity. At step 33, the method 30 includes rotating the second calendering roll at a second rotational velocity that is greater than the first rotational velocity. At step 34, the method 30 includes rotating the third calendering roll at a third rotational velocity that is greater than the second rotational velocity. Steps 32, 33, and 34 may occur simultaneously. At step 35, the method 30 includes delivering a first dry electrode material by the multi-roll calender system to the first nip to form a dry electrode film. At step 36, the method 30 includes delivering the dry electrode film by the multi-roll calender system to the second nip to form a first tuned dry electrode film. At step 37, the method 30 includes laminating the first tuned dry electrode film to a current collector to form a dry electrode.

The method 30 may include step 41. Step 41 includes providing the first dry electrode material to the multi-roll calender system by a moving belt system comprising a continuous moving belt and/or a rewind roll. The method 30 may include step 42. Step 42 includes providing the first dry electrode material to the multi-roll calender system by scatter coating. The method 30 may include step 43. Step 43 includes calendering, via a continuous belt calendering device, the first dry electrode material prior to delivering the first dry electrode material by the multi-roll calender system to the first nip. The method 30 may include step 44. Step 44 includes rewinding the dry electrode to form a rolled dry electrode.

In some examples, the multi-roll calender system can include any of the features described herein. The multi-roll calender system can include any of the features described with reference to FIGS. 3A and 6. For example, the multi-roll calender system can include 1, 2, 3, 4, 5, 6 or more additional calendering rolls.

Figure 2:
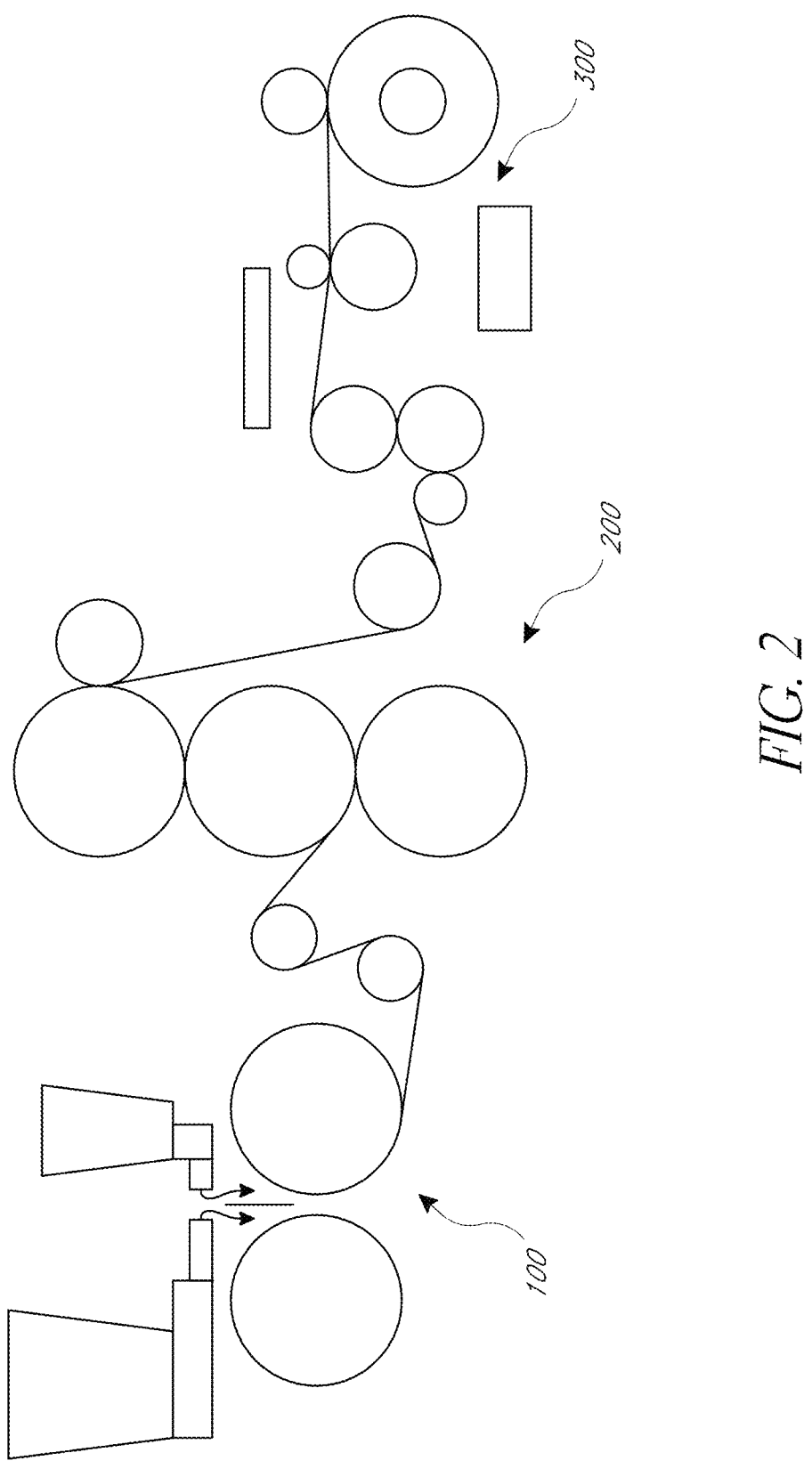
FIG. 2 shows an apparatus for forming a dry electrode film.

FIG. 2 shows an apparatus for forming a structure of an electrode. The apparatus in FIG. 2 contains three interconnected system portions, 100, 200 and 300. In 100, dry particles are initially stored in containers and are fed as free flowing dry particles to a high-pressure nip of a roll-mill. Separate streams of dry particles become intermixed and begin to lose their freedom of motion as the dry particles are fed towards the nip. An intermixed compacted dry self-supporting film exits component part 100 and enters component part 200. The compacted dry film, as it exits 100 must be a self-supporting film, in order to proceed further to portion 200 without falling apart. In order to be self-supporting, the film exiting the rolls in portion 100 has to be thicker than the actual desired electrode film thickness. Thus, in system portion 200, the self-supporting film is fed through a tension control system into a calendering system (shown as three larger vertical rolls), with a plurality of nips which iteratively compact the density and decrease the thickness of the dry film closer to a desired thickness/density. The dry film exits component part 200 and enters system portion 300. Portion 300 comprises one or more idler rolls, dancer rolls, additional nips and/or a rewind/storage roll to further process the dry film into a final dry electrode film, which can be rolled in a rewind station. The final, rolled electrode film can then be transferred to another machine for unwinding and laminating to a collector to form a dry electrode.

Figures 3A, 3B:
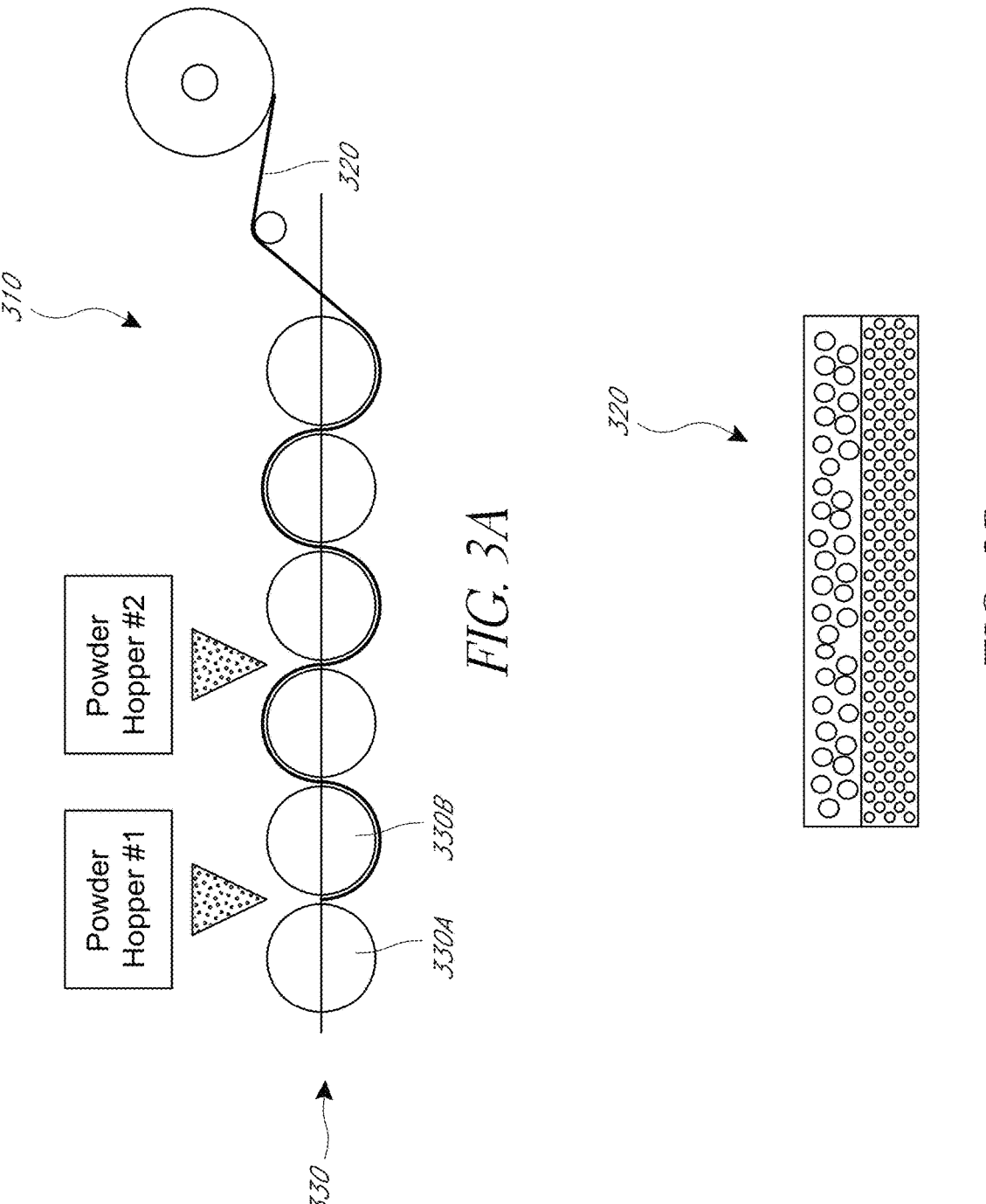
FIGS. 3A-B illustrate a side schematic view of a multi-roll calender system and a film made from said calender system, respectively.

FIGS. 3A-B illustrate a side schematic view of a multi-roll calender system 310 and a film 320 made from said calender system, respectively. The calender system can include one or more dry electrode material delivery systems, such as powder delivery hoppers. For illustrative purposes, the system includes two powder hoppers, shown as powder hopper #1 and powder hopper #2. The particles sizes, density, porosity, and/or type of materials, and/or other material characteristics in powder hopper #1 and powder hopper #2 can be the same with respect to each other. The particles sizes, density, porosity, and/or type of materials, and/or other material characteristics in powder hopper #1 and powder hopper #2 can be different with respect to each other.

The calender machine as shown comprises six rolls 330, although more or less quantities of rolls can be implemented. A downstream roll 330B along the web path can be configured to rotate faster than the previous upstream roll 330A. The increased downstream roll speed induces a shear in the film while in the roll nip causing the film to adhere to the faster rotating roll. An even further downstream roll can rotate even faster than the previous, and so forth, such that the film can remain adhered to all the rolls along the web path of the entire calender machine. This adherence can allow the film that is initially formed in the calender system in FIG. 3A to be formed from dry materials, but need not initially be self-supporting, because the film is supported and adhered to all the rolls along the web path. This adherence and support in turn can reduce or completely eliminate the need for idler rolls between roll nips, such as those described with reference to FIG. 2. The increased shear within the nip can also reduce the pressures and forces needed for calendering a film to a desired thickness, relative to other dry film equipment, such as that shown in FIG. 2. Thus, less complicated, and lower force (and thus smaller) equipment can be implemented, than that for the system in FIG. 2. Each roll temperature for the system in FIG. 3A can also be individually controllable. FIG. 3B illustrates a side view of a film 320 made from a calender system such as that illustrated in FIG. 3A, when the particles in powder hopper #1 are different in size from the particles in powder hopper #2.

Figure 4:
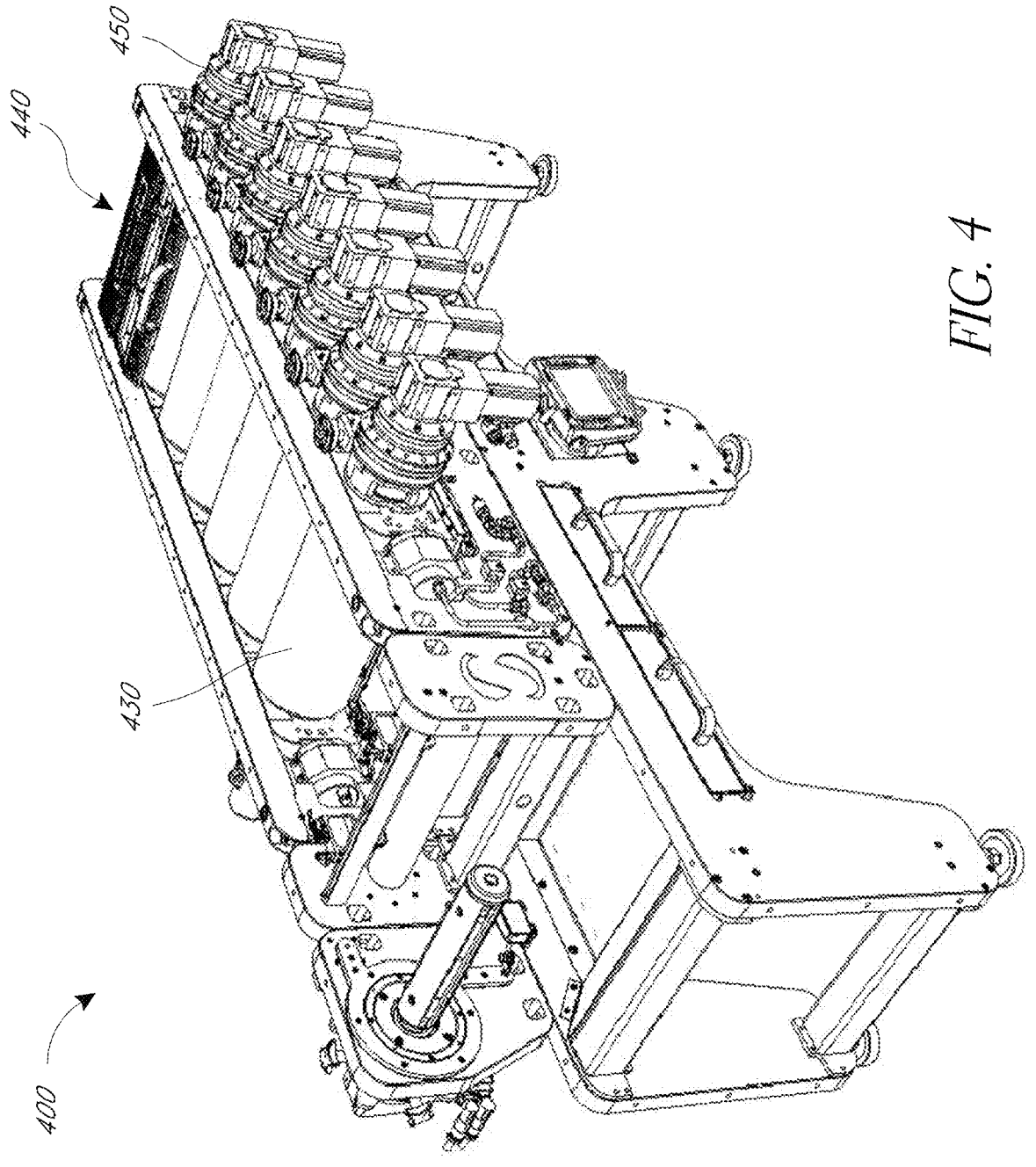
FIG. 4 illustrates a detailed isometric view of a multi-roll calender system.

FIG. 4 illustrates a multi-roll calender system 400. The system has six rolls 430 with one powder hopper 440, for illustrative purposes; greater or lesser quantities are possible. Each of the six rolls along the web path can be configured to rotate faster than the previous roll, for film adherence, as described above. FIG. 4 shows individual motors 450 (e.g., servo motors), the speed, acceleration, timing, etc., of which can be individually controlled with a controller (not shown). The controller can also be configured to control other aspects of the system, such as to control the gap distance between the rolls, the temperatures of each roll, and/or other system parameters. A controller can be similarly implemented within the other system described herein.

Figure 5A:
FIGS. 5A-C illustrate some of the operating steps of the system shown in FIG. 4.
Figure 5B:
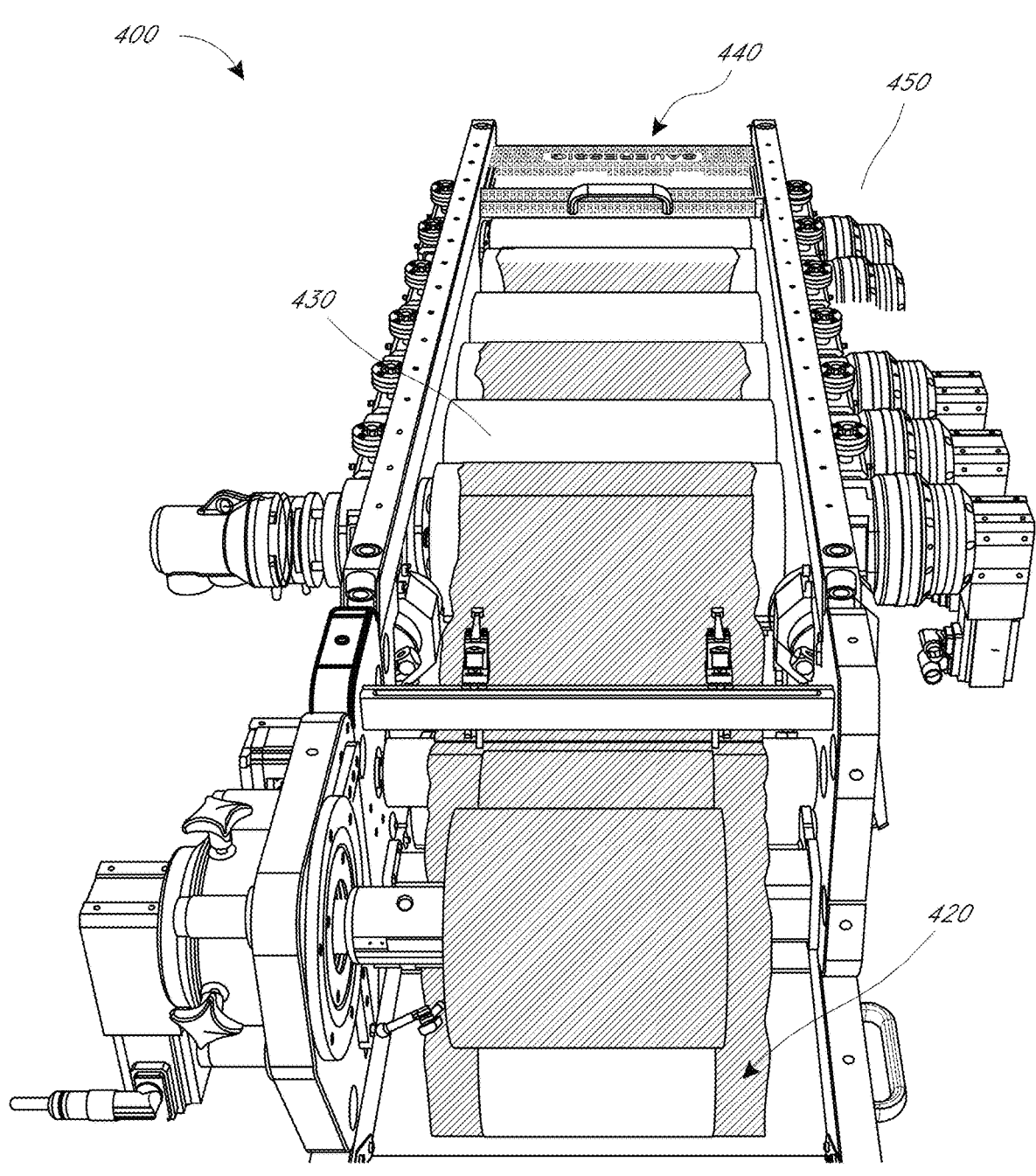
Figure 5C:
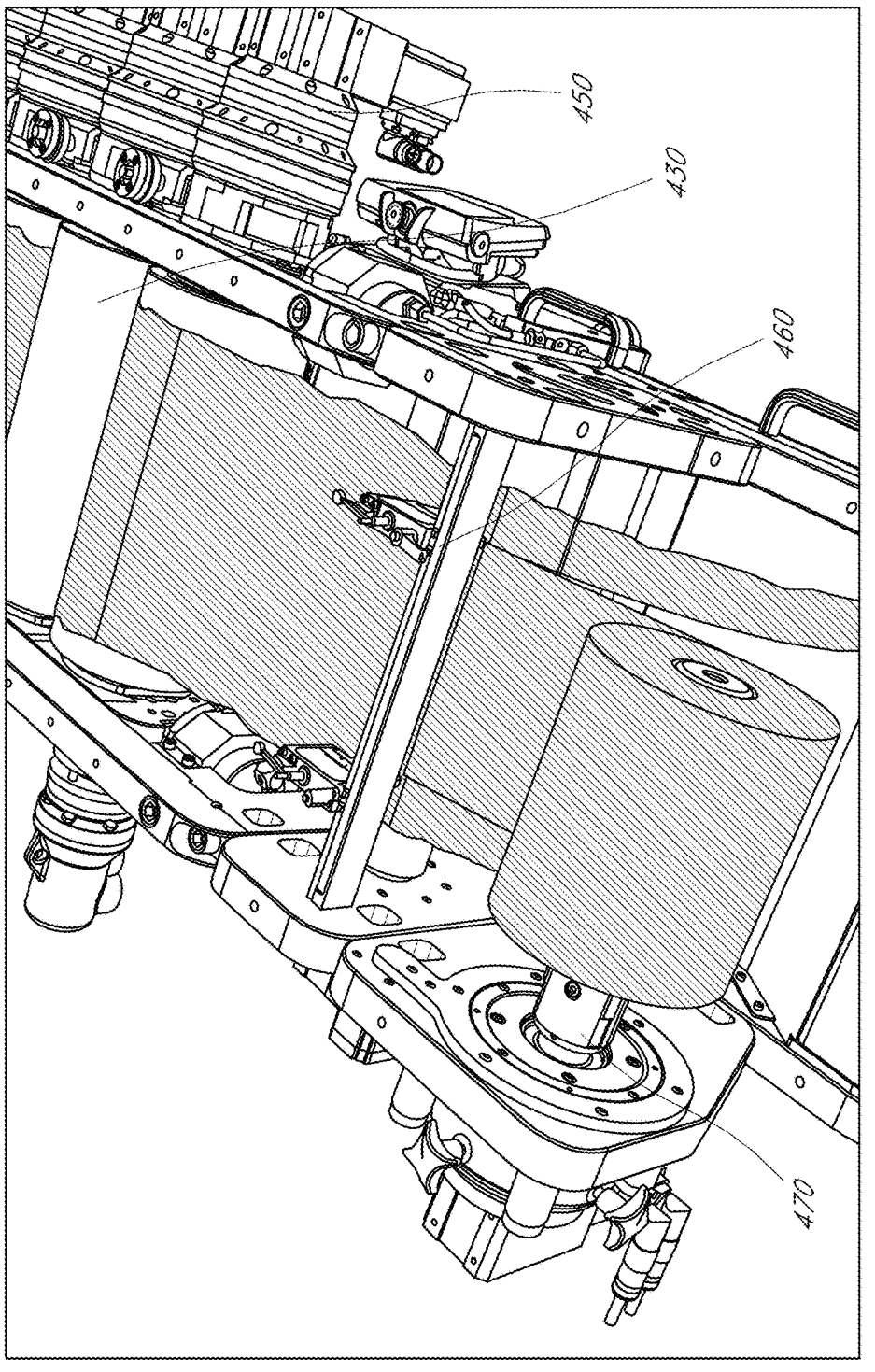

FIGS. 5A-C illustrate some of the operating steps of the multi-roll calender system 400 of FIG. 4. In FIG. 5A, a powder 445 is added to one roll nip section of the calender system. In FIG. 5B, the film 420 is transferred between the rolls 430 without need for idler rolls. In FIG. 5C, a doctor blade 460 assists in the removal of film from the last roll. The film edges are trimmed and the film is then wound on a core 470.

Figure 6:
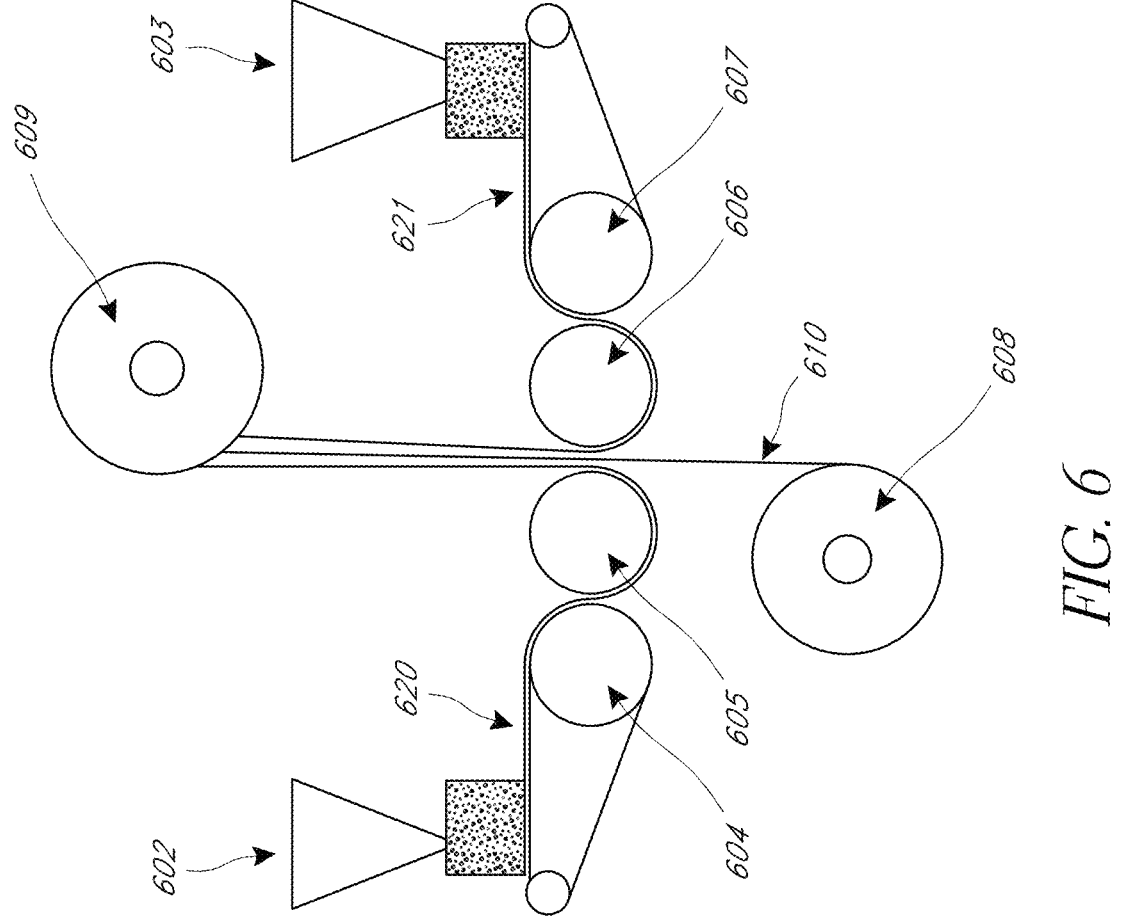
FIG. 6 illustrates a side schematic view of a combination calender/laminator machine to form a dry electrode.

FIG. 6 illustrates a combination calender/laminator system 600 which can manufacture two dry electrode films, and laminate them to a current collector, to form a double sided electrode. In FIG. 6, there are two dry electrode material delivery systems, shown as powder hoppers, 602 and 603 and four rolls, 604, 605, 606 and 607. A current collector 610 can be provided from a current collector source 608. A first dry electrode film 620 can be formed by calendering particles from powder hopper 602 through a first nip formed between rolls 604 and 605. A second dry electrode film 621 can be formed by calendering particles from powder hopper 603 through a second nip formed between rolls 606 and 607. Both films 620 and 621 can be laminated onto a first and second opposing side, respectively, of the current collector 610. The lamination can be provided by compressing (e.g., calendering) films 620 and 621, and current collector 610 between a third nip formed between roll 605 and 606. In addition to lamination, this third nip may also provide additional calendering and tuning of the film thickness of films 620 and 621. After lamination between rolls 605 and 606, the double sided electrode is collected for further processing, for example, via a rewind station 609. As illustrated in FIG. 6, the roll nips are positioned in sequence, and close together, which provides for continuous calendering and film thickness reduction, which reduces or completely negates the need for idler or dancer rolls. Each of the rolls in can be controlled for velocity, acceleration, speed, etc., as described elsewhere herein. The subsequent rolls each turn slightly faster than the last one allowing the film to follow the rolls to the last section where the film is pulled off the last roll and wound onto a core on rewind station 609.

The system in FIG. 6 can be implemented to produce a single sided electrode, for example, by eliminating roll 607 and hopper 603, and without film 621. Additionally, rolls 604 and 607 are part of a belt-calender system as shown, in which the belt provides additional support and surface area for application of dry electrode material thereupon. One or more belt systems (like rollers 604 and 607) or non-belt systems (like rollers 605 and 606), or combinations thereof, can be implemented within any of the embodiments herein.

Figure 7:
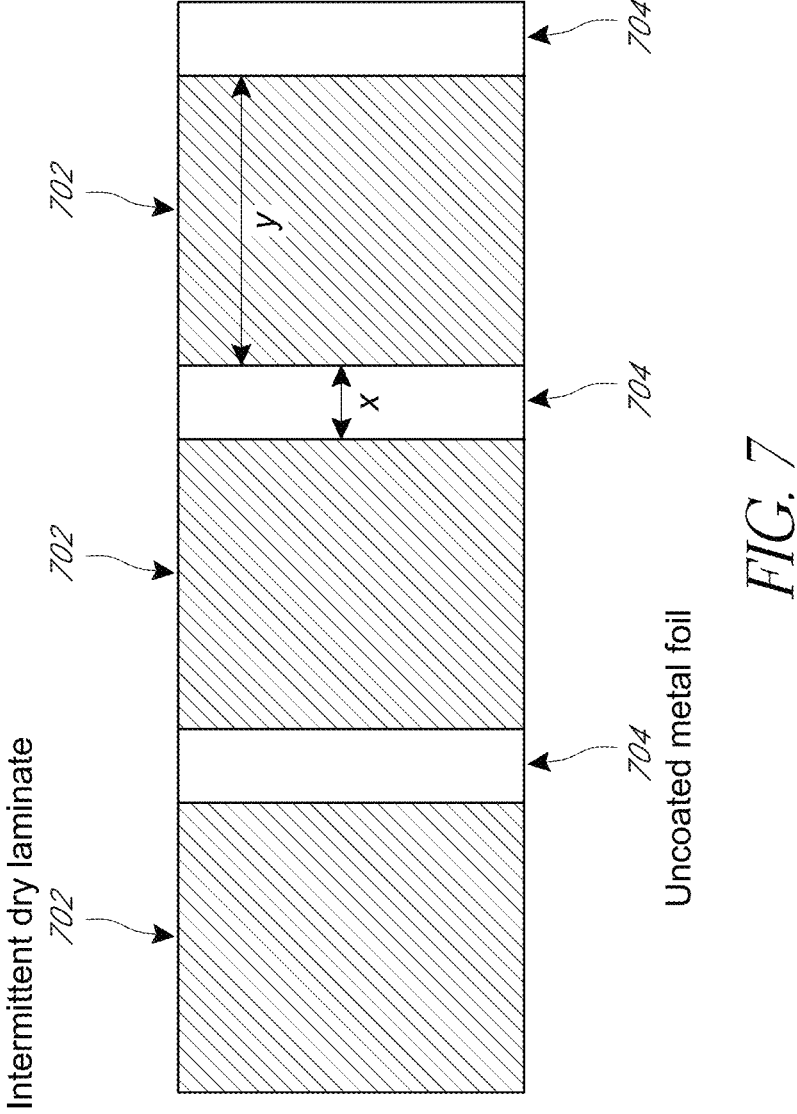
FIG. 7 illustrates a side schematic view of an intermittently coated dry electrode according to an embodiment.

FIG. 7 illustrates an intermittently coated dry electrode according to an embodiment. An intermittent electrode includes intermittently coated portions 702 with gaps x therebetween without coating, to form uncoated foil portions 704. At least one of the uncoated foil portions 704 can be used for electrically connecting the electrode to other elements such as an electrode tab.

Figures 8A, 8B:
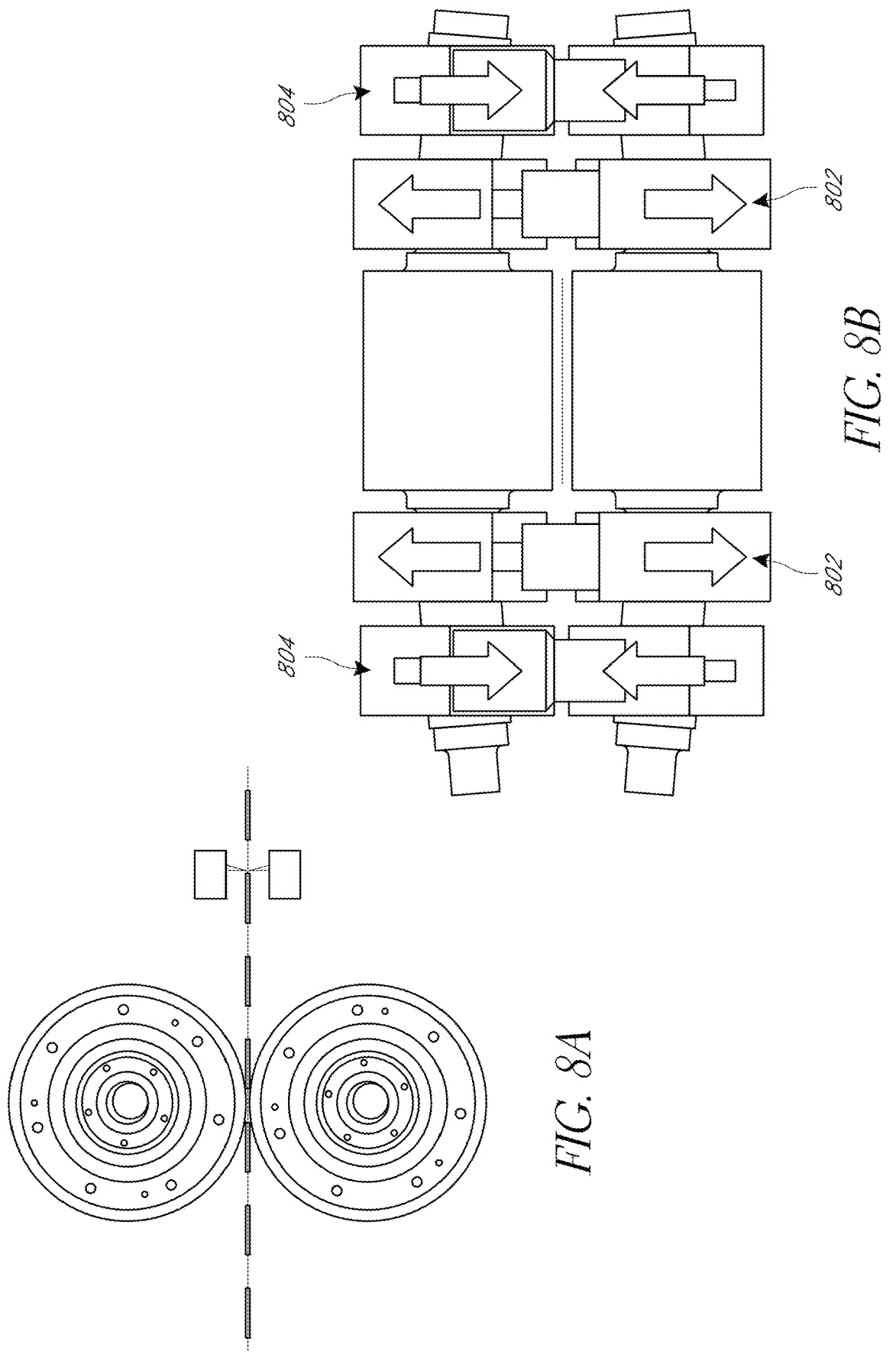
FIGS. 8A-B illustrate a side view and a front view of a laminator design.

FIGS. 8A-B illustrate a side view and a front view of a laminator embodiment. The laminator can be implemented within a system such as system 600 in FIG. 6. The rolls in the laminator of FIGS. 8A-8B can be similar to rolls 605, 606 in FIG. 6. The laminator can include one or more lamination actuators, such as pressure cylinders 804 which provide the main force which laminates the current collector and electrode film being fed through the laminator to form the electrode. However, during lamination of an intermittent electrode, such as that shown in FIG. 7, the rolls in the laminator can slam together when being compressed against the uncoated (foil only) portions 704. To reduce this slamming effect, the laminator can include one or more gap control actuators, such as cylinders 802 configured to oppose the forces in cylinders 804, and provide constant gap during lamination in non-coated areas. A sensor (FIG. 8A) can be configured to detect non-coated or non-laminated areas. When detected non-coated or non-laminated area is detected, gap control cylinders 802 are engaged, to counteract the lamination pressure of the main force cylinders. The gap is maintained and the rolls do not slam into the non-coated areas which would otherwise deform or break the intermittent laminated web.

Figure 9:
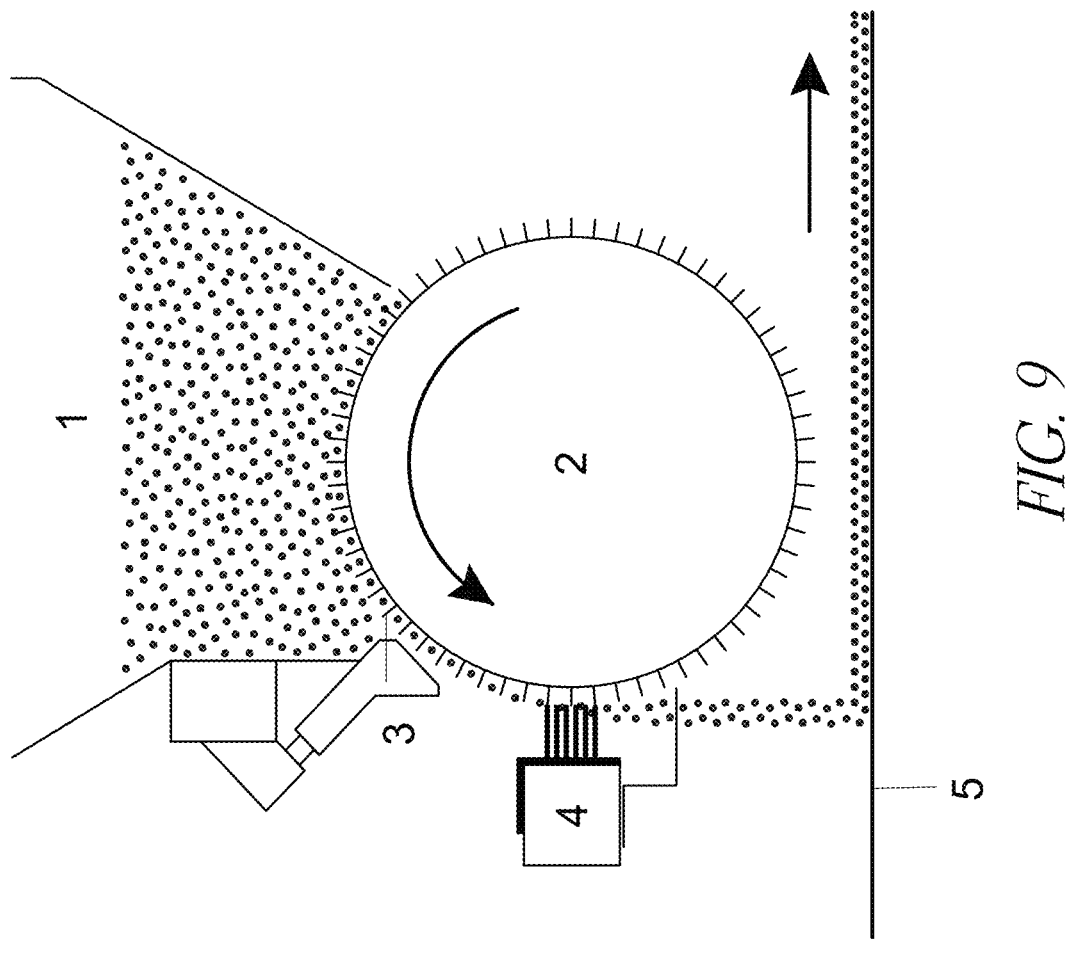
FIG. 9 illustrates a funnel-shaped charging hopper.

FIG. 9 illustrates a funnel-shaped charging hopper 1 which can be implemented within embodiments of the systems and methods described herein. The hopper can be supplied with bulk material by means of suction or worm conveyers. Inside the charging hopper the bulk material is uniformly distributed and the level is kept constant during the scattering process. Cavity formation and decomposition of the material is avoided through a special mixer. The rotary metering roller is fixed to the bottom side of the charging hopper. The size of the cells of the metering roller are selected according to the grain size of the bulk material. The bulk material is picked up by the metering roller 2 and stripped at a flexible doctor blade 3. After that the accurately dosed bulk material is conveyed to an oscillating brushing device 4. Following the brushing process the bulk material will be examined and transferred to the subjacent substrate line 5.

Figure 10:
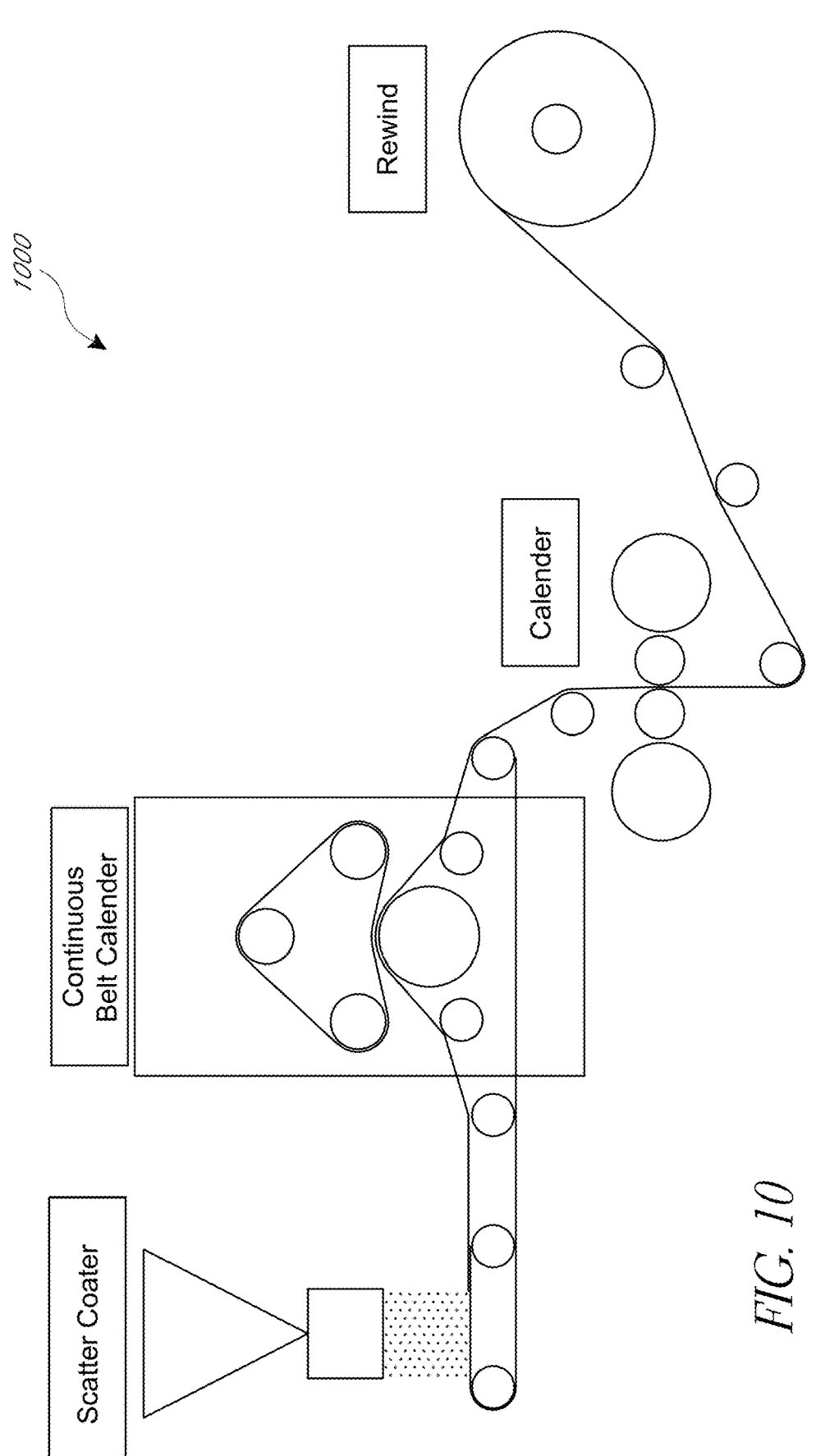
FIG. 10 illustrates a calendering process comprised of a scatter coating process, a continuous belt calender process, a calender process, and a rewind process.

FIG. 10 illustrates a calendering process 1000 comprised of a scatter coating process, a continuous belt calender process, a calender process, and a rewind process. A scatter coater can deposit a very thin layer of powder onto the belt and when the thin layer is calendered through the nip of the calender rolls, results in fabrication of a thin film. The powder is collected within the groves or bristles of the main rotating drum then a secondary rotating brush removes the powder from the groves or bristles allowing the powder to deposit onto the moving belt. Once the powder is compressed into a film within the first nip, the film will travel through the subsequent nips to achieve the desired thickness and or density.

An energy storage device as provided herein can be of any suitable configuration, for example planar, spirally wound, button shaped, interdigitated, or pouch. An energy storage device as provided herein can be a component of a system, for example, a power generation system, an uninterruptible power source systems (UPS), a photo voltaic power generation system, an energy recovery system for use in, for example, industrial machinery and/or transportation. An energy storage device as provided herein may be used to power various electronic device and/or motor vehicles, including hybrid electric vehicles (HEV), plug-in hybrid electric vehicles (PHEV), and/or electric vehicles (EV).

As used herein, the terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result.

The scope of the present disclosure is not intended to be limited by the specific disclosures of embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

What is claimed is:

1. A method of manufacturing a dry electrode via a multi-roll calender system, comprising:

providing the multi-roll calender system including a first calendering roll, a second calendering roll downstream from the first calendering roll and a third calendering roll downstream from the second calendering roll, wherein a first nip is formed between the first calendering roll and the second calendering roll, and a second nip is formed between the second calendering roll and the third calendering roll;

rotating the first calendering roll at a first rotational velocity;

rotating the second calendering roll at a second rotational velocity that is greater than the first rotational velocity;

rotating the third calendering roll at a third rotational velocity that is greater than the second rotational velocity;

delivering a first dry electrode material by the multi-roll calender system to the first nip to form a dry electrode film;

delivering the dry electrode film by the multi-roll calender system to the second nip to form a first tuned dry electrode film; and laminating the first tuned dry electrode film to a current collector to form the dry electrode.

2. The method of claim 1, wherein the first dry electrode material is in free flowing particle form.

3. The method of claim 1, wherein the dry electrode film adheres to the second calendering roll during the delivering of the first dry electrode material to the first nip.

4. The method of claim 1, wherein a diameter of the first calendering roll is substantially equal to a diameter of the second calendering roll and the diameter of the second calendering roll is substantially equal to a diameter of the third calendering roll.

5. The method of claim 1, wherein a linear velocity of an outer surface of the second calendering roll is greater than a linear velocity of an outer surface of the first calendering roll, and a linear velocity of an outer surface of the third calendering roll is greater than the linear velocity of the outer surface of the second calendering roll.

6. The method of claim 1, further comprising generating a first shear force in the first dry electrode material at the first nip and generating a second shear force in the dry electrode film at the second nip.

7. The method of claim 1, wherein a third nip is formed between the third calendering roll and a calendering roll positioned adjacent to the third calendering roll.

8. The method of claim 7, further comprising:

supplying the current collector from a current collector source to the third nip; and laminating the current collector to the first tuned dry electrode film at a position of the third nip to form the dry electrode.

9. The method of claim 7, further comprising:

delivering a second dry electrode material by the multi-roll calender system to the first tuned dry electrode film at the third nip, wherein the first and second dry electrode materials are delivered to the third nip to form an electrode film.

10. The method of claim 9, wherein the first and second dry electrode materials are different materials.

11. The method of claim 1, further comprising:

rotating a fourth calendering roll, wherein a fourth nip is formed between the fourth calendering roll and a calendering roll positioned adjacent to and downstream of the fourth calendering roll.

12. The method of claim 11, further comprising delivering a second dry electrode material by the multi-roll calender system to the fourth nip to form a second dry electrode film.

13. The method of claim 12, wherein the first dry electrode material and the second dry electrode material are the same material.

14. The method of claim 12, wherein the calendering roll positioned adjacent to and downstream of the fourth calendering roll is a fifth calendering roll.

15. The method of claim 14, further comprising rotating the fourth calendering roll at a fourth rotational velocity; and rotating the fifth calendering roll at a fifth rotational velocity, wherein the fifth rotational velocity is greater than the fourth rotational velocity.

16. The method of claim 15, further comprising:

a fifth nip formed between a sixth calendering roll and the fifth calendering roll, and delivering the second dry electrode film to the fifth nip to form a second dry tuned electrode film.

17. The method of claim 16, wherein the providing the system further comprises providing a third nip positioned between the third calendering roll and a calendering roll positioned adjacent to the third calendering roll, and the method further comprises:

delivering the second dry tuned electrode film by the multi-roll calender system to the third nip; and supplying the current collector from a current collector source to the third nip;

wherein laminating the first tuned dry electrode film to a current collector to form a dry electrode further comprises laminating the current collector to the first tuned dry electrode film and the second dry tuned electrode film at a position of the third nip to form a dual sided dry electrode.

18. The method of claim 11, wherein the providing the system further comprises providing the fourth calendering roll positioned adjacent to and downstream of the third calendering roll.

19. The method of claim 18, further comprising rotating the fourth calendering roll at a fourth rotational velocity, wherein the fourth rotational velocity is greater than the third rotational velocity.

20. The method of claim 1, further comprising providing the first dry electrode material to the multi-roll calender system by scatter coating.

21. The method of claim 1, further comprising providing the first dry electrode material to the multi-roll calender system by a moving belt system.

22. The method of claim 21, wherein the moving belt system is a continuous moving belt.

23. The method of claim 21, wherein the moving belt system comprises a rewind roll.

24. The method of claim 1, further comprising rewinding the dry electrode to form a rolled dry electrode.

25. The method of claim 1, further comprising calendering, via a continuous belt, calendaring device the first dry electrode material prior to delivering the first dry electrode material by the multi-roll calender system to the first nip.

\* \* \* \* \*